(12) United States Patent
Miyahara et al.

(10) Patent No.: US 7,691,207 B2
(45) Date of Patent: Apr. 6, 2010

(54) METHOD FOR CLEANING DISK-SHAPE GLASS SUBSTRATE AND MAGNETIC DISK

(75) Inventors: Osamu Miyahara, Yokohama (JP);
Kazuo Mannami, Yokohama (JP);
Kuniyuki Someya, Chiyoda-ku (JP);
Tsutomu Maruyama, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 445 days.

(21) Appl. No.: 11/486,010

(22) Filed: Jul. 14, 2006

(65) Prior Publication Data

US 2007/0017547 A1 Jan. 25, 2007

(30) Foreign Application Priority Data

Jul. 19, 2005 (JP) .............................. 2005-208684

(51) Int. Cl.
*B08B 6/00* (2006.01)
*C25F 1/00* (2006.01)
*C25F 3/30* (2006.01)
*C25F 5/00* (2006.01)

(52) U.S. Cl. ........................ 134/1.3; 438/745; 438/746; 438/747

(58) Field of Classification Search .................. None
See application file for complete search history.

(56) References Cited

U.S. PATENT DOCUMENTS

| 5,624,501 A | * | 4/1997 | Gill, Jr. ........................ 134/6 |
| 5,893,381 A | * | 4/1999 | Terui ............................. 134/6 |
| 6,254,688 B1 | * | 7/2001 | Kobayashi et al. ............. 134/1 |
| 6,318,386 B1 | * | 11/2001 | Kamikawa et al. ......... 134/99.2 |
| 6,588,043 B1 | * | 7/2003 | Frost et al. ..................... 15/77 |
| 6,678,911 B2 | * | 1/2004 | Krupa et al. ................... 15/77 |

FOREIGN PATENT DOCUMENTS

| JP | 2001-96245 | 4/2001 |
| JP | 2002-74653 | 3/2002 |
| JP | 2003-151126 | 5/2003 |

* cited by examiner

*Primary Examiner*—Duy-Vu N Deo
(74) *Attorney, Agent, or Firm*—Oblon, Spivak, McClelland, Maier & Neustadt, L.L.P.

(57) ABSTRACT

A method for cleaning a disk-shape glass substrate, which comprises rotating the disk-shape glass substrate on its center with its main surface vertical, and making a cleaning fluid irradiated with ultrasonic waves run down on the outer peripheral edge surface of the rotating glass substrate.

11 Claims, 2 Drawing Sheets

METHOD FOR CLEANING DISK-SHAPE GLASS SUBSTRATE AND MAGNETIC DISK

BACKGROUND

I. Technological Field

The present invention relates to a method for cleaning a disk-shape glass substrate to be used for e.g. a magnetic disk, and a magnetic disk.

II. Description of Related Art

A magnetic disk having e.g. a magnetic layer formed on a disk-shape glass substrate (hereinafter sometimes referred to simply as a glass substrate) has been widely used for a small hard disk such as a personal digital assistant.

A glass substrate to be used for a magnetic disk is produced usually by cleaning and drying a precisely polished glass substrate.

Cleaning of a glass substrate is carried out commonly by immersing it in a plurality of cleaning fluid tanks such as a cleaner tank and a pure water tank in order and conducting ultrasonic cleaning in each tank. In recent years, for the purpose of securely and effectively removing an abrasive which is firmly attached to the glass substrate, it has been proposed to carry out scrubbing cleaning before or during the ultrasonic cleaning (see JP-A-2002-74653). The scrubbing cleaning is to clean a glass substrate by rotating two scrubbing rollers each having a scrubbing pad formed on its surface in opposite directions so that the glass substrate is sandwiched therebetween, and rotating the glass substrate.

As described above, a glass substrate is becoming used widely for a small hard disk, and the area of a recording area on the main surface is reduced along with the downsizing of the hard disk. Accordingly, in addition to a demand for a high recording density, improvement in the proportion (recording area proportion) of the area which effectively functions as a recording area to the area of the main surface is increasing.

In order to meet the above demands, not only the cleanness on the main surface of the glass substrate has to be improved to achieve a high recording density but also the cleanness on the outer peripheral edge surface of the glass substrate has to be improved, since if the cleanness on the outer peripheral edge surface of the glass substrate is insufficient, the stain present on the edge surface on which the cleanness is insufficient will expand to the main surface of the glass substrate in the process of handling the glass substrate, thus decreasing the recording area proportion.

BRIEF SUMMARY

Under these circumstances, it is an object of the present invention to provide a method for cleaning a glass substrate capable of improving the cleanness on the outer peripheral edge surface of a glass substrate, and a magnetic disk using a glass substrate cleaned by such a cleaning method.

The present invention provides a method for cleaning a disk-shape glass substrate, which comprises rotating the disk-shape glass substrate on its center with its main surface vertical, and making a cleaning fluid irradiated with ultrasonic waves run down on the outer peripheral edge surface of the rotating glass substrate.

The present invention further provides the above method for cleaning a disk-shape glass substrate which is a method for cleaning a plurality of disk-shape glass substrates (plural substrates cleaning method), wherein the plurality of disk-shape glass substrates are rotated on their center by a method of storing the plurality of disk-shape glass substrates in a substrate holder capable of vertically holding them while their lower portions are exposed and they are separated from one another, supporting the plurality of disk-shape glass substrates on two rotatable shafts so that the outer peripheral edge surfaces at the exposed lower portions are in contact with the two rotatable shafts, and rotating the two rotatable shafts to rotate the disk-shape glass substrates on their center.

The present invention still further provides a magnetic disk produced by using a glass substrate for a magnetic disk cleaned by the above method for cleaning a disk-shape glass substrate.

According to the present invention, the cleanness on the glass substrate edge surface can be increased, whereby the cleanness at a portion in the vicinity of the edge surface on the main surface can be increased, and the recording area proportion can be improved.

Further, the edge surface of a glass substrate with a small outer diameter can easily be cleaned.

Further, a highly clean edge surface usually obtainable only by carrying out the cleaning a plurality of times in the case of scrubbing cleaning, will be obtained by cleaning only once. Further, the cleaning time can be shortened.

Further, in a case where ultrasonic cleaning is carried out while the glass substrate is immersed in a cleaning fluid, cleaning fluid tanks differing in the size depending upon the size of the glass substrate must be used, or it is highly possible that the stain removed from the glass substrate remains in the cleaning fluid and adheres to the glass substrate again. However, according to the present invention, such problems will not occur or are not likely to occur.

In the case of scrubbing cleaning, only one substrate can be cleaned at a time. However, according to the plural substrates cleaning method of the present invention, a plurality of substrates can be cleaned all at once. Further, it is not necessary to take out glass substrates from a substrate holder for cleaning or to put the cleaned glass substrate into the substrate holder again.

The cleaning method of the present invention is suitable in a case where the disk-shape glass substrate is a glass substrate for a magnetic disk.

In the accompanying drawings:

DETAILED DESCRIPTION

Now, the cleaning method of the present invention will be described in detail with reference to FIGS. 1 and 2 which are drawings illustrating the plural substrates cleaning method, with reference to a case where the glass substrate is a glass substrate for a magnetic disk. However, the present invention is not limited thereto.

Figure 1:
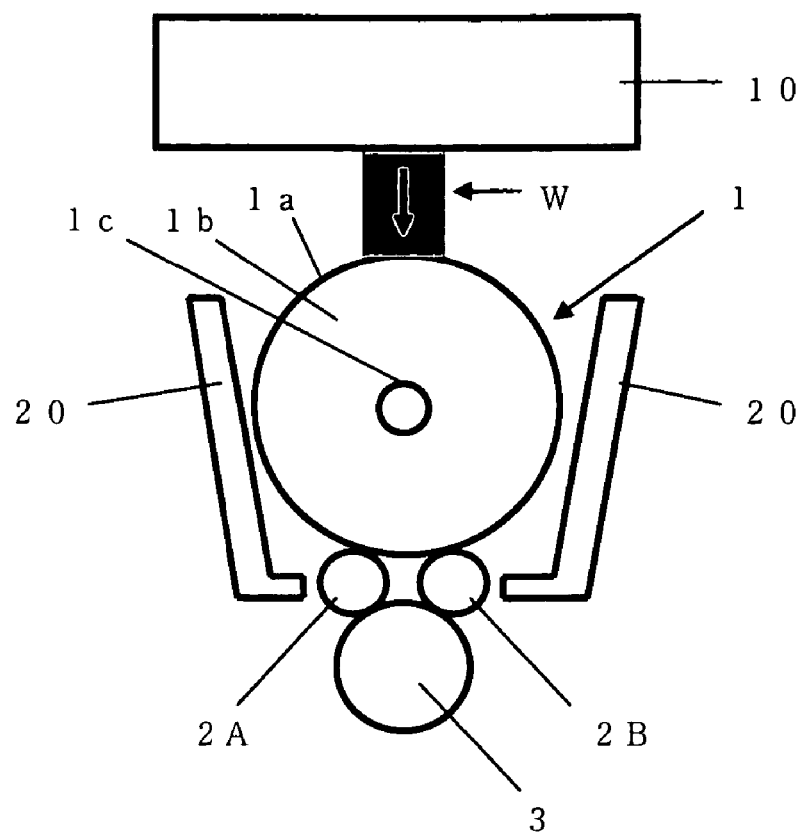
FIG. 1 is a cross-section schematically illustrating the cleaning method of the present invention.

FIG. 1 is a cross-section schematically illustrating the cleaning method of the present invention, which comprises making a cleaning fluid W irradiated with ultrasonic waves run down on outer peripheral edge surfaces 1a of a plurality of glass substrates 1 vertically held in parallel with the direction perpendicular to the plane of the sheet and separated from one another, in the direction of an arrow (in the vertical direction). The symbol 20 represents a substrate holder.

Figure 2:
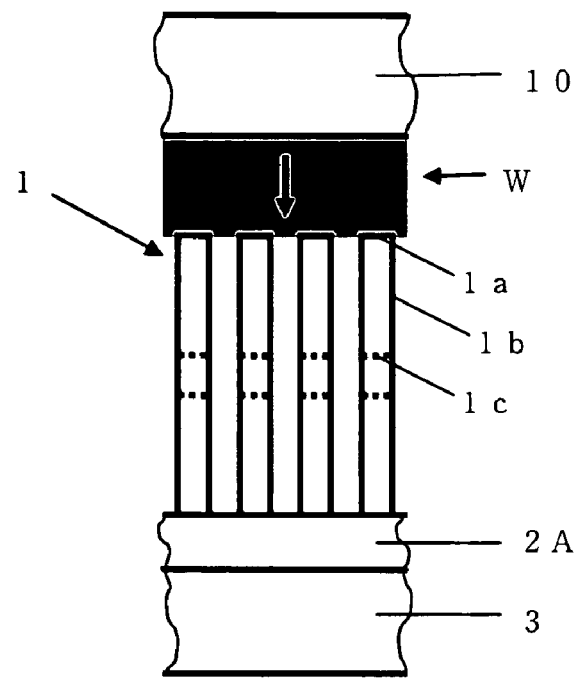
FIG. 2 is a partial side view schematically illustrating the cleaning method of the present invention.

FIG. 2 is a partial side view schematically illustrating the cleaning method of the present invention. In the drawing, the substrate holder 20 is not shown.

The glass substrate 1 is a precisely polished one, and it may be cleaned by the cleaning method of the present invention, scrubbing cleaning or the like after the precise polishing, or may not be cleaned. The glass substrate 1 is preferably maintained in a wet state after the precise polishing.

The symbol 1b represents a main surface and 1c an inner peripheral edge surface.

The glass substrate 1 usually has a hole at its center as shown in FIG. 1. However, the present invention is applicable also to a disk-shape glass substrate having no hole.

The symbols 2A and 2B are rotatable shafts (rotational shafts) supporting the lower portions of the outer peripheral edge surfaces 1a of the glass substrates 1, and they are rotated on their axis at the time of cleaning to rotate the glass substrates 1 on their center. The rotational shafts preferably have their surface covered with a resin.

The symbol 3 represents a driving shaft, and by its rotation, the rotational shafts 2A and 2B are rotated.

The rotation direction of the glass substrates 1 may be constant, but is preferably reversed periodically.

The symbol 10 represents an apparatus to apply ultrasonic waves to a cleaning fluid and make the cleaning fluid irradiated with ultrasonic waves run down, and is called a running water type high-frequency ultrasonic cleaner (running water type cleaner).

The running water type high-frequency ultrasonic cleaner may be typically products of Honda Electronics Co., Ltd. such as W-357LS-380. MHz (Mega-hertz) high-frequency ultrasound applied to running water produces accelerated droplets of the cleaning fluid such as water, and the cleaning liquid in such a state removes contaminant particles on the sub-micrometer order.

The running water type cleaner 10 usually has nozzles (not shown) to make the cleaning fluid run down and ultrasonic vibrators (not shown), and ultrasonic waves are emitted from the ultrasonic vibrators toward the cleaning fluid passing through the nozzles.

In the case of the above W-357LS-380, slit nozzles with a width of 2 mm and a length of 400 mm from which the cleaning fluid runs down are formed on the bottom, and on the sides of each nozzle, four ultrasonic vibrators with a length of about 100 mm are set. From these ultrasonic vibrators, ultrasonic waves are emitted toward the cleaning fluid passing thought the nozzles. The running cleaning fluid has a width of 2 mm and an effective length of 380 mm.

The cleaning fluid W which runs down from the running water type cleaner 10 falls onto the outer peripheral edge surface 1a and falls down along the main surface 1b or the outer peripheral edge surface 1a (the falling cleaning fluid is not shown in FIGS. 1 and 2). Ultrasonic waves are present in the cleaning fluid W in contact with the outer peripheral edge surface 1a, and by the ultrasonic waves, the cleanness on the outer peripheral edge surface 1a and the main surface 1b at a portion in the vicinity of the outer peripheral edge surface 1a will be improved.

The symbol 20 represents a substrate holder, capable of vertically holding a plurality of glass substrates 1 while their lower portions are exposed and they are separated from one another.

Figure 3:
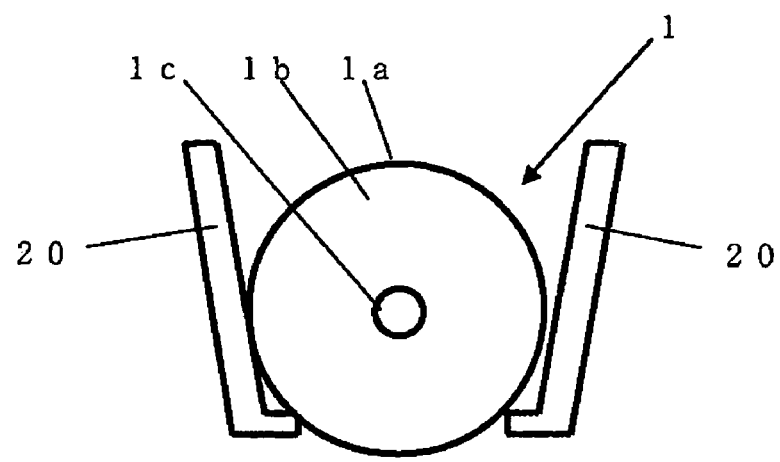
FIG. 3 is a cross-section illustrating a substrate holder holding glass substrates.

FIG. 3 is a cross-section illustrating such a substrate holder 20 holding a plurality of glass substrates 1. The substrate holder 20 may be a commercial product, and it has supporting members (not shown) such as pultrusions or recesses to hold the glass substrates 1 so that they are separated from one another, on its inner side.

The substrate holder 20 is to vertically hold the glass substrates 1 when horizontally held, but usually the glass substrates 1 are held to lean on the upper portion of the supporting members of the substrate holder 20, and thus the glass substrates 1 are not necessarily strictly vertically held. "Vertically held" in the present invention includes the above case, and typically includes a case where the substrates are held at an angle of at most 3° to the vertical direction.

Supporting of the plurality of the glass substrates 1 by the rotational shafts 2A and 2B as shown in FIG. 1 and 2, can be realized by bringing the lower outer peripheral edge surfaces of the plurality of the glass substrates 1 stored and held in the substrate holder 20 in a state shown in FIG. 3 exposed from the substrate holder 20, into contact with the above rotational shafts 2A and 2B, and moving the rotational shafts 2A and 2B upward relative to the substrate holder 20 or by moving the substrate holder 20 further downward relative to the rotational shafts 2A and 2B.

In FIG. 1, the rotational shafts 2A and 2B, the driving shaft 3 and the substrate holder 20 are supported by a supporter not shown, and it is preferably to reciprocate the supporter from side to side to vibrate the glass substrates 1 from side to side relative to the cleaning fluid W. The reciprocation is preferably such that the supporting members of the substrate 20 move to a position onto which the cleaning fluid W falls down.

Typically, the glass substrate has a diameter (D) less than 65 mm and a thickness (t) less than 1 mm, and for example, t is 0.38 mm when D is 27.4 mm, and t is 0.51 mm when D is 48 mm.

According to the cleaning method of the present invention, the cleaning effect may be exerted even on a portion other than a portion in the vicinity of the outer peripheral edge surface 1a on the main surface 1b.

In a case where it is desired that the cleaning effect is exerted on the entire main surface 1b, D is preferably at most 40 mm.

The cleaning fluid is not limited so long as it is less likely to foam even when irradiated with ultrasonic waves, and it may, for example, be an alkali cleaning fluid or a functional water such as hydrogen water, ozone water or ion water, and it is typically water, particularly pure water.

The distance between a position at which the cleaning fluid irradiated with ultrasonic waves starts running down, i.e. the nozzle tip in the case of the above W-357LS-380, and the outer peripheral edge surface of the glass substrate onto which the running cleaning fluid falls, is preferably at most 20 mm. If it exceeds 20 mm, the ultrasonic waves in the running cleaning fluid W tends to be significantly attenuated, whereby improvement of cleanness on the edge surface may be insufficient. It is more preferably at most 5 mm, typically at most 3 mm.

FIGS. 1 and 2 illustrate a cleaning method in such a disposition that the slit of the running water type cleaner and the main surfaces of the glass substrate are at right angles, but the present invention is not limited thereto. For example, such a cleaning method may be employed that the glass substrates are moved one by one while they are rotated in the direction of the slit so that the cleaning fluid runs down on the outer peripheral edge surfaces of the glass substrates, that is, the slit and the main surface of the glass substrates are in the same plane.

The magnetic disk of the present invention can be produced by forming a magnetic layer and the like on a glass substrate for a magnetic disk cleaned by the cleaning method of the present invention, by a known method.

Now, the present invention will be described in further detail with reference to Examples. However, it should be understood that the present invention is by no means restricted to such specific Examples.

EXAMPLE 1

A $SiO_2$—$Al_2O_3$—$R_2O$—RO glass (wherein $R_2O$ is an alkali metal oxide, and RO is an alkaline earth metal oxide) was processed and ground to prepare a circular glass plate having a diameter of 28.5 mm and a thickness of 0.6 mm.

A hole was put at the center of the circular glass plate, followed by chamfering, polishing (precision polishing), etc. to prepare a 1.1 inch glass substrate having D of 27.4 mm, an inner diameter of 7.0 mm and t of 0.38 mm.

Using two substrate holders HD27-710 (length: 200 mm, width 35 mm) manufactured by HYMOLD PTE, capable of storing 25 such 1.1 inch glass substrates, 50 such glass substrates were stored in these substrate holders and cleaned by the cleaning method of the present invention shown in FIGS. 1 and 2.

Namely, using as a running water type cleaner, W-357LS-380 manufactured by Honda Electronics Co., Ltd. and as a cleaning fluid pure water (resistivity at 25° C.: 17 MΩ·cm or higher), cleaning was carried out with a flow amount of water running down from the cleaner to the glass substrate outer peripheral edge surface of 7 L/min per 100 mm in length of the slit, at a distance between the nozzle tip of the cleaner and the glass substrate outer peripheral edge surface of 1.5 mm, at an ultrasonic frequency of 1 MHz at an ultrasonic vibrator power of 250 W for 2.5 minutes.

During the cleaning, the glass substrates were rotated at a rate of 180 revolutions per minute, and supporters supporting the substrate holders and the like were reciprocated from side to side at a rate of 10 reciprocations/min.

Then, the glass substrates were immersed in a tank filled with an alkali cleaner having a pH of 11 to carry out ultrasonic cleaning, immersed in a first pure water tank to carry out ultrasonic cleaning, and finally immersed in a second pure water tank to carry out ultrasonic cleaning, and then dried by a spin drying method.

With respect to main surfaces (one surface will be referred to as side A, and the other side will be referred to as side B) of two glass substrates 1a and 1b among these glass substrates thus obtained, the number and the distribution state of particles (very fine deposit) having heights of at least 0.01 μm were observed by an optical defect analyser ODT manufactured by Hitachi Electronics Engineering Co., Ltd. The measurement results are shown in Table 1. Here, the outer periphery neighborhood represents a portion within 3 mm from the outer periphery on the main surface.

EXAMPLE 2

The running water type cleaner has been known to be used for wafer cleaning. In such a case, a wafer is horizontally held, and a cleaning fluid is made to run down directly on its surface (main surface).

Cleaning and drying were carried out in the same manner as in Example 1 except that one 1.1 inch glass substrate prepared in the same manner as in Example 1 was cleaned by a cleaning method (horizontal cleaning) in accordance with the above known cleaning method instead of the cleaning method of the present invention carried out in Example 1. The vertical cleaning was carried out as follows. Namely, three points at the outer peripheral portion were held by tilted clips made by a resin, and the entire substrate was placed on a mesh belt and moved so that the substrate passed immediately below the nozzle with a distance between the nozzle tip and the substrate surface of 5 mm over a period of 1.5 minutes. Then, the inner peripheral portion was held and the substrate was reversed, and the other side was also cleaned similarly by moving the substrate immediately below the nozzle over a period of 1.5 minutes. Then, the substrate was put in the same holder as in Example 1, and cleaned and dried. This Example corresponds to a Comparative Example.

With respect to main surfaces of the glass substrate 2a thus obtained, the number and the distribution state of particles were measured in the same manner as in Example 1. The measurement results are shown in Table 1.

In Example 2, the number of particles is large as compared with Example 1, and non-uniform distribution to the outer periphery neighborhood is confirmed both on sides A and B. This is considered to be because the cleanness on the outer peripheral edge surface achieved by the above cleaning was insufficient, whereby the particles on the outer peripheral edge surface moved to the outer periphery neighborhood on the main surfaces by the subsequent handling of the glass substrate.

EXAMPLE 3

Cleaning and drying were carried out in the same manner as in Example 1 using two 1.1 inch glass substrates prepared in the same manner as in Example 1 except that cleaning was carried out by means of scrubbing cleaning instead of the cleaning method of the present invention carried out in Example 1. The scrubbing cleaning was carried out as follows. Namely, sponge brushes (scrubbing rolls) were rotated at a rate of 100 revolutions per minute, and substrates were cleaned by using an alkali cleaner for 10 seconds per one substrate. This Example corresponds to a Comparative Example.

With respect to the main surfaces of the glass substrates 3a and 3b thus obtained, the number and the distribution state of particles were measured in the same manner as in Example 1. The measurement results are shown in Table 1.

As compared with Example 1, the number of particles exceeds 20 on one side in Example 3, and non-uniform distribution to the outer periphery neighborhood is confirmed on some sides.

Further, in Example 1, 50 substrates can be cleaned all at once in 2.5 minutes i.e. 150 seconds, whereas in Example 3, 10 seconds are required for cleaning one substrate, and further, at least 3 seconds are required for exchanging the cleaned substrate, and accordingly, 13 seconds/substrate×50 substrates i.e. 650 seconds or more are required for preparing 50 substrates. Therefore, it is understood that the cleaning method of the present invention can remarkably shorten the cleaning time per one substrate as compared with conventional scrubbing cleaning. Further, the number of substrates which can be cleaned all at once by the cleaning method of the present invention is not limited to 50, and for example, when a large running water type cleaner is employed so that the number of substrates is more than 50, the cleaning time per one substrate can further be shortened.

TABLE 1

| Glass substrate | Main surface | Number | Non-uniform distribution to outer periphery neighborhood |
|---|---|---|---|
| 1a | Side A | 19 | Nil |
|  | Side B | 12 | Nil |
| 1b | Side A | 13 | Nil |
|  | Side B | 13 | Nil |
| 2a | Side A | 49 | Observed |
|  | Side B | 33 | Observed |
| 3a | Side A | 18 | Observed |
|  | Side B | 13 | Nil |
| 3b | Side A | 15 | Nil |
|  | Side B | 23 | Observed |

EXAMPLE 4

Fifty 1.1 inch glass substrates were prepared in the same manner as in Example 1.

The glass substrates were subjected to scrubbing cleaning in the same manner as in Example 3 and then cleaned and dried in the same manner as in Example 1.

With respect to main surfaces of two glass substrates 4a and 4b among the glass substrates thus obtained, the number and the distribution state of particles with sizes of at least 1.5 µm were measured by OSA (Optical Surface Analyser) manufactured by KLA-tencor. The measurement results are shown in Table 2.

EXAMPLE 5

Two 1.1 inch glass substrates were prepared in the same manner as in Example 1.

The glass substrates were subject to scrubbing cleaning in the same manner as in Example 3, and then in the same manner as in Example 1, immersed in a tank filled with an alkali cleaner having a pH of 11 to carry out ultrasonic cleaning, immersed in a first pure water tank to carry out ultrasonic cleaning, and finally immersed in a second pure water tank to carry out ultrasonic cleaning, and then dried by a spin drying method. This Example corresponds to a Comparative Example.

With respect to main surfaces of the glass substrates 5a and 5b thus obtained, the number and the distribution state of particles were measured in the same manner as in Example 4. The measurement results are shown in Table 2.

In Example 5, the number of sides on which the particles are non-uniformly distributed to the outer periphery neighborhood is large (side A of 5a and sides A and B of 5b) in Example 5, and the number of particles on these sides is larger than that on any side in Example 4. Accordingly, it is understood that in Example 4, fine particles particularly on the outer peripheral edge surface are effectively removed, whereby particles are not non-uniformly distributed to the outer periphery neighborhood, and the number of particles on the main surfaces is small.

TABLE 2

| Glass substrate | Main surface | Number | Non-uniform distribution to outer periphery neighborhood |
|---|---|---|---|
| 4a | Side A | 170 | Nil |
|  | Side B | 151 | Nil |

TABLE 2-continued

| Glass substrate | Main surface | Number | Non-uniform distribution to outer periphery neighborhood |
|---|---|---|---|
| 4b | Side A | 126 | Nil |
|  | Side B | 146 | Nil |
| 5a | Side A | 310 | Observed |
|  | Side B | 145 | Nil |
| 5b | Side A | 420 | Observed |
|  | Side B | 504 | Observed |

EXAMPLE 6

The same glass as in Example 1 was processed and ground to prepare a circular glass plate having a diameter of 22.5 mm and a thickness of 0.6 mm.

A hole was made at the center of the circular glass plate, followed by chamfering, polishing (precision polishing), etc. to prepare a 0.85 inch glass substrate having D of 21.6 mm, an inner diameter of 6.0 mm and t of 0.38 mm.

50 such 0.85 inch glass substrates were subjected to scrubbing cleaning in the same manner as in Example 3.

Using two substrate holders HD21-100 (length: 200 mm, width: 35 mm) manufactured by HYMOLD PTE, capable of storing 25 such 0.85 inch glass substrates, the 50 scrubbing-cleaned glass substrates were stored in these substrate holders and cleaned by the cleaning method of the present invention shown in FIGS. 1 and 2.

Namely, using as a running water type cleaner, W-357LS-380 manufactured by Honda Electronics Co., Ltd., and pure water as a cleaning fluid, cleaning was carried out with a flow amount of water running down from the cleaner to the glass substrate outer peripheral edge surface of 7 L/min per 100 mm in length of the slit, at a distance between the nozzle tip of the cleaner and the glass substrate outer peripheral edge surface of 2 mm, at an ultrasonic frequency of 1 MHz at an ultrasonic vibrator power of 250 W for 2.5 minutes.

During the cleaning, the glass substrates were rotated at a rate of 180 revolutions per minute, and supporters supporting the substrate holders and the like were reciprocated from side to side at a rate of 10 reciprocations/min.

Then, the glass substrates were immersed in a tank filled with an alkali cleaner having a pH of 11 to carry out ultrasonic cleaning, immersed in a first pure water tank to carry out ultrasonic cleaning, and finally immersed in a second pure water tank to carry out ultrasonic cleaning, and then dried by a spin drying method.

With respect to main surfaces of two glass substrates 6a and 6b among the glass substrates thus obtained, the number and the distribution state of particles having sizes of at least 1.5 µm were measured by the above OSA. The measurement results are shown in Table 3.

EXAMPLE 7

Two 0.85 inch glass substrates were prepared in the same manner as in Example 1.

The glass substrates were subject to scrubbing cleaning in the same manner as in Example 3, and then in the same manner as in Example 6, immersed in a tank filled with an alkali cleaner having a pH of 11 to carry out ultrasonic cleaning, immersed in a first pure water tank to carry out ultrasonic cleaning, and finally immersed in a second pure water tank to carry out ultrasonic cleaning, and then dried by a spin drying method. This Example corresponds to a Comparative Example.

With respect to main surfaces of the glass substrates 7a and 7b thus obtained, the number and the distribution state of particles were measured in the same manner as in Example 4. The measurement results are shown in Table 3.

In Example 7, the number of particles is large as compared with Example 6 and the cleaning is remarkably insufficient in a certain side (side B of 7b). Further, in Example 7, non-uniform distribution of particles to the outer periphery neighborhood is confirmed on some sides, whereby it is understood that the improvement in cleanness on the outer peripheral edge surface is insufficient.

TABLE 3

| Glass substrate | Main surface | Number | Non-uniform distribution to outer periphery neighborhood |
|---|---|---|---|
| 6a | Side A | 54 | Nil |
|    | Side B | 51 | Nil |
| 6b | Side A | 65 | Nil |
|    | Side B | 80 | Nil |
| 7a | Side A | 87 | Observed |
|    | Side B | 91 | Nil |
| 7b | Side A | 91 | Nil |
|    | Side B | 131 | Observed |

EXAMPLE 8

Fifty 0.85 inch glass substrates were prepared in the same manner as in Example 6.

The fifty 0.85 inch glass substrates were cleaned by the cleaning method of the present invention in the same manner as in Example 6.

Then, the glass substrates were immersed in a tank filled with an alkali cleaner having a pH of 11 to carry out ultrasonic cleaning, immersed in a first pure water tank to carry out ultrasonic cleaning, and finally immersed in a second pure water tank to carry out ultrasonic cleaning, and then dried by a spin drying method.

With respect to main surfaces of two glass substrates 8a and 8b among the glass substrates thus obtained, the number and the distribution state of particles were measured by the above ODT. The measurement results are shown in Table 4.

EXAMPLE 9

Two 0.85 inch glass substrates prepared in the same manner as in Example 6 were cleaned and dried in the same manner as in Example 8 except that cleaning was carried out by the same scrubbing cleaning as in Example 3 instead of the cleaning method of the present invention carried out in Example 8. This Example corresponds to a Comparative Example.

With respect to main surfaces of the glass substrates 9a and 9b thus obtained, the number and the distribution state of particles were measured in the same manner as in Example 8. The measurement results are shown in Table 4.

In Example 9, the number of particles is large as compared with Example 8, and cleaning was remarkably insufficient on one side (side A of 9a). Further, in Example 9, non-uniform distribution of particles to the outer periphery neighborhood is confirmed on one side, whereby it is understood that improvement in cleanness on the outer peripheral edge surface is insufficient.

TABLE 4

| Glass substrate | Main surface | Number | Non-uniform distribution to outer periphery neighborhood |
|---|---|---|---|
| 8a | Side A | 4 | Nil |
|    | Side B | 1 | Nil |
| 8b | Side A | 3 | Nil |
|    | Side B | 3 | Nil |
| 9a | Side A | 17 | Observed |
|    | Side B | 5 | Nil |
| 9b | Side A | 6 | Nil |
|    | Side B | 4 | Nil |

The present invention is useful for cleaning of a glass substrate for a magnetic disk. Further, the glass substrate cleaned by the cleaning method of the present invention can be used for a small hard disk such as a personal digital assistant.

The entire disclosure of Japanese Patent Application No. 2005-208684 filed on Jul. 19, 2005 including specification, claims, drawings and summary is incorporated herein by reference in its entirety.

What is claimed is:

1. A method for cleaning a disk-shape glass substrate, comprising:
   rotating the disk-shape glass substrate on it's center with it's main surface vertical; and
   making a cleaning fluid irradiated with ultrasonic waves run down on an outer peripheral edge surface of the rotating glass substrate while the glass substrate is not immersed in cleaning fluid contained in a tank.

2. The method for cleaning a disk-shape glass substrate according to claim 1, wherein the disk-shape glass substrate has a diameter less than 65 mm.

3. The method for cleaning a disk-shape glass substrate according to claim 1, wherein the cleaning fluid is water.

4. The method for cleaning a disk-shape glass substrate according to claim 1, wherein a distance between a position where the cleaning fluid irradiated with ultrasonic waves starts running down and the outer peripheral edge surface of the glass substrate onto which the running cleaning fluid falls, is at most 20 mm.

5. The method for cleaning a disk-shape glass substrate according to claim 1, wherein the disk-shape glass substrate is a glass substrate for a magnetic disk.

6. The method for cleaning a disk-shape glass substrate according to claim 1, further comprising:
   providing an ultrasonic cleaning device including at least one outlet that provides the cleaning fluid irradiated with ultrasonic waves that runs down on the outer peripheral edge surface of the rotating glass substrate, said outlet defining a position where the cleaning fluid irradiated with ultrasonic waves starts running down; and
   positioning said disk-shape glass substrate below said ultrasonic cleaning device outlet.

7. The method for cleaning a disk-shape glass substrate according to claim 6, wherein a distance between the position where the cleaning fluid irradiated with ultrasonic waves starts running down and the outer peripheral edge surface of the glass substrate onto which the running cleaning fluid falls is at most 20 mm.

8. The method for cleaning a disk-shape glass substrate according to claim 1, further comprising:
   immersing the glass substrate in a tank holding cleaning fluid after making the cleaning fluid irradiated with ultrasonic waves run down on the outer peripheral edge surface of the rotating glass substrate.

9. A method for cleaning a plurality of disk-shape glass substrates, comprising:

rotating the plurality of disk-shape glass substrates on centers of the plurality of disk-shape glass substrates, each of the plurality of disk-shape glass substrates having an outer peripheral edge surface;

and making a cleaning fluid irradiated with ultrasonic waves run down on the outer peripheral edge surfaces of the plurality of rotating glass substrates while the glass substrates are not immersed in cleaning fluid contained in a tank, wherein the rotating further comprises:

storing the plurality of disk-shape glass substrates in a substrate holder capable of vertically holding the plurality of disk-shape glass substrates, exposing lower portions of the plurality of disk-shape glass substrates from the substrate holder, separating the plurality of disk-shape glass substrates from one another, supporting the plurality of disk-shape glass substrates on two rotatable shafts so that the outer peripheral edge surfaces at the exposed lower portions are in contact with the two rotatable shafts, and rotating the two rotatable shafts to rotate the plurality of disk-shape glass substrates on their centers.

10. The method for cleaning a disk-shape glass substrate according to claim 9, further comprising:

providing an ultrasonic cleaning device including at least one outlet that provides the cleaning fluid irradiated with ultrasonic waves that runs down on the outer peripheral edge surfaces of the rotating glass substrates, said outlet defining a position where the cleaning fluid irradiated with ultrasonic waves starts running down; and positioning said disk-shape glass substrates below said ultrasonic cleaning device outlet.

11. The method for cleaning a disk-shape glass substrate according to claim 10, wherein a distance between the position where the cleaning fluid irradiated with ultrasonic waves starts running down and the outer peripheral edge surfaces of the glass substrates onto which the running cleaning fluid falls is at most 20 mm.

* * * * *